United States Patent
Nanjo

[11] Patent Number: 6,157,493
[45] Date of Patent: Dec. 5, 2000

[54] ZOOM LENS

[75] Inventor: Yusuke Nanjo, Kanagawa, Japan

[73] Assignee: Sony Corporation, Tokyo, Japan

[21] Appl. No.: 09/352,103

[22] Filed: Jul. 14, 1999

[30] Foreign Application Priority Data

Jul. 17, 1998 [JP] Japan ................................. 10-203444
Oct. 9, 1998 [JP] Japan ................................. 10-287706

[51] Int. Cl.[7] ................................................ G02B 15/14
[52] U.S. Cl. ........................ 359/676; 359/683; 359/684
[58] Field of Search ................................. 359/676, 683, 359/684

[56] References Cited

U.S. PATENT DOCUMENTS

| | | | |
|---|---|---|---|
| 5,440,430 | 8/1995 | Sato | 359/683 |
| 5,585,969 | 12/1996 | Endo | 359/683 |
| 5,694,252 | 12/1997 | Yahagi | 359/684 |
| 5,760,966 | 6/1998 | Tanaka et al. | 359/683 |

*Primary Examiner*—Georgia Epps
*Assistant Examiner*—Jordan M. Schwartz
*Attorney, Agent, or Firm*—Frommer Lawrence & Haug, LLP.; William S. Frommer

[57] ABSTRACT

A zoom lens of high image quality having various aberrations improved and most suitably used with a still camera is disclosed. A first lens group (Gr1) to a fifth lens group (Gr5) having positive, negative, positive, positive and substantially zero refracting powers, respectively, are arranged in that order from an object side toward an image surface side. The third lens group (Gr3) is configured of a joint lens of a convex lens and a concave lens, while the fifth lens group is configured of a joint lens of a concave lens and a convex lens. The conditions $-0.018 < 1/\upsilon 3 < 0.018$, $10 < |\upsilon 5.1 - \upsilon 5.2|$ and $1 < |r5.2/fW \cdot \tan \omega W| < 3$ are satisfied, where $\upsilon 3$ is the equivalent Abbe's number of the third lens group, $\upsilon 5.1$ is the Abbe's number of the lens of the fifth lens group nearer to the object side, $\upsilon 5.2$ is the Abbe's number of the lens of the fifth lens group nearer to the image surface side, $r5.2$ is the radius of curvature of the lens joint surface of the fifth lens group, fW is the focal length of the whole lens system at the wide angle edge, and $\omega W$ is the half field angle at the wide angle edge.

14 Claims, 13 Drawing Sheets

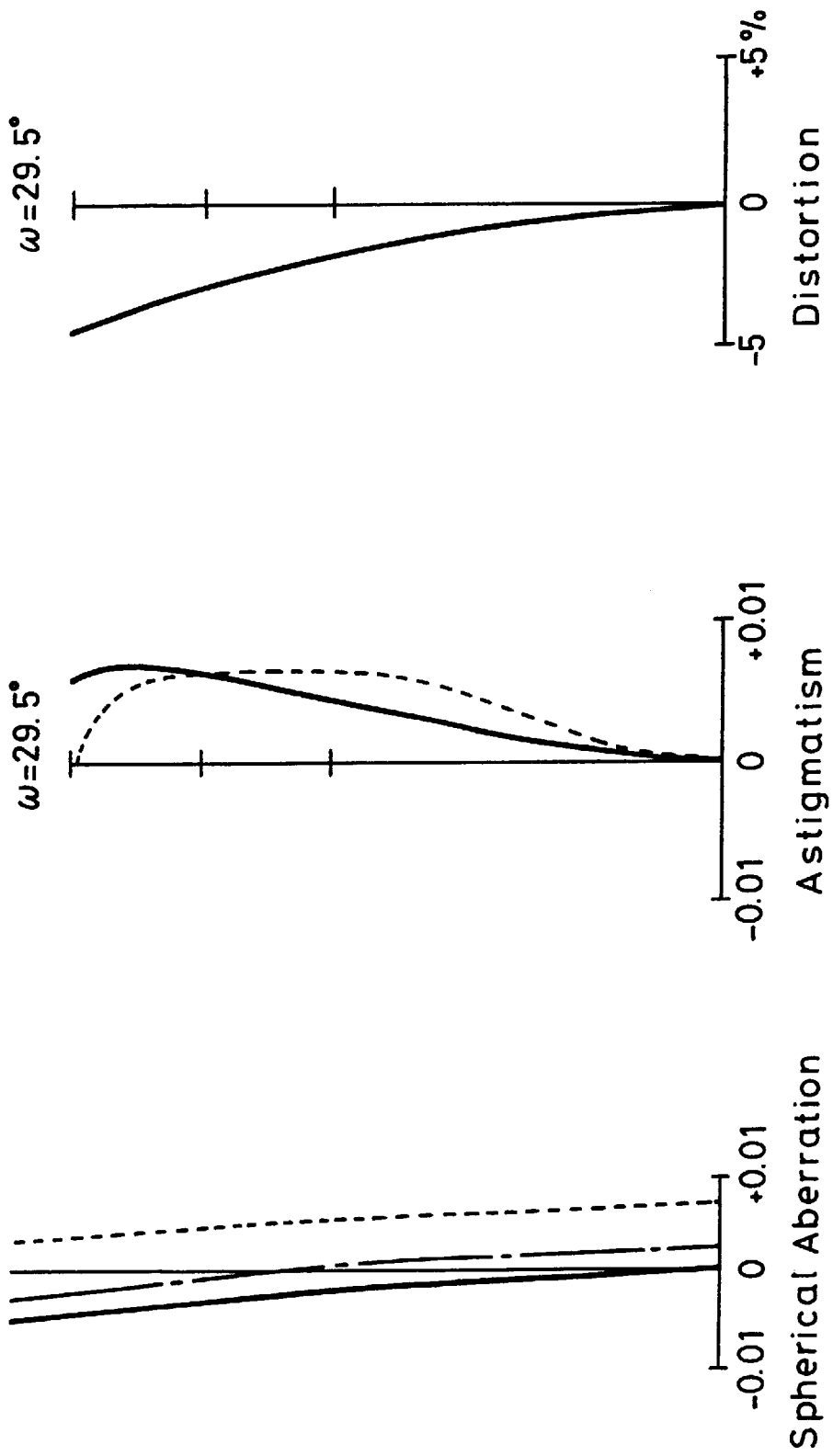

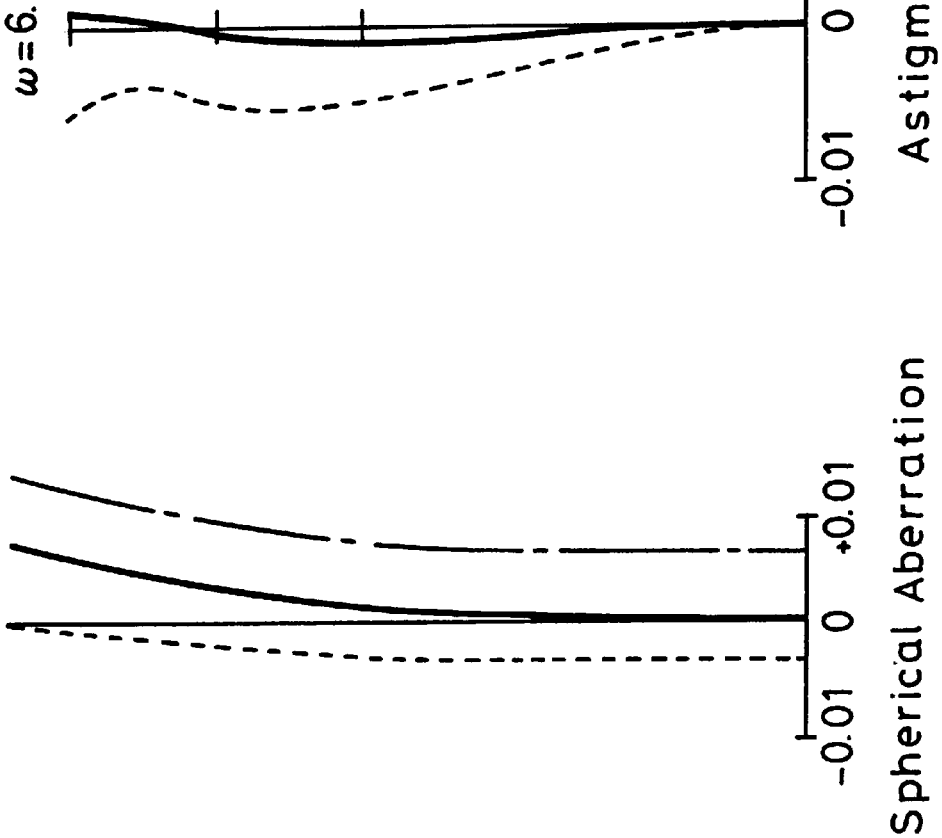

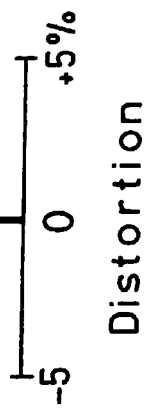
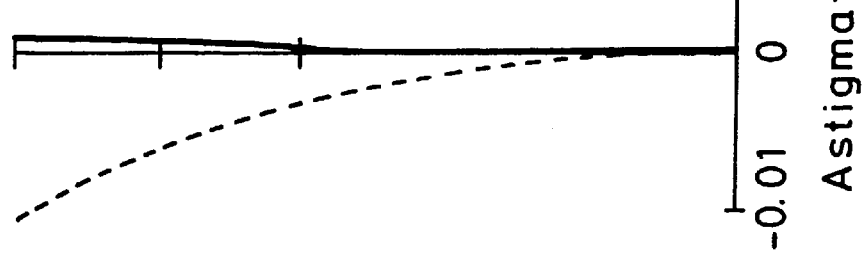
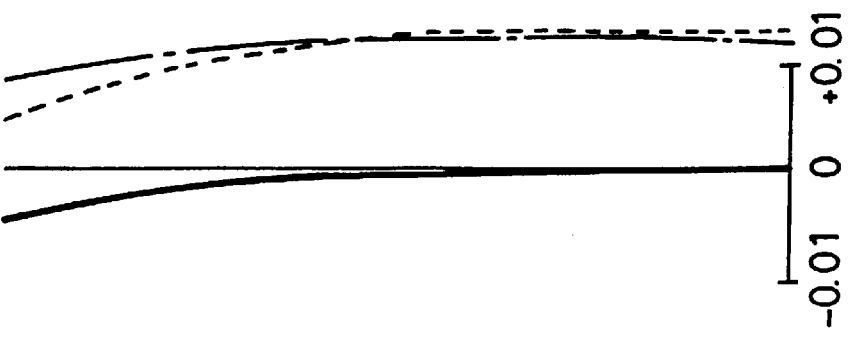

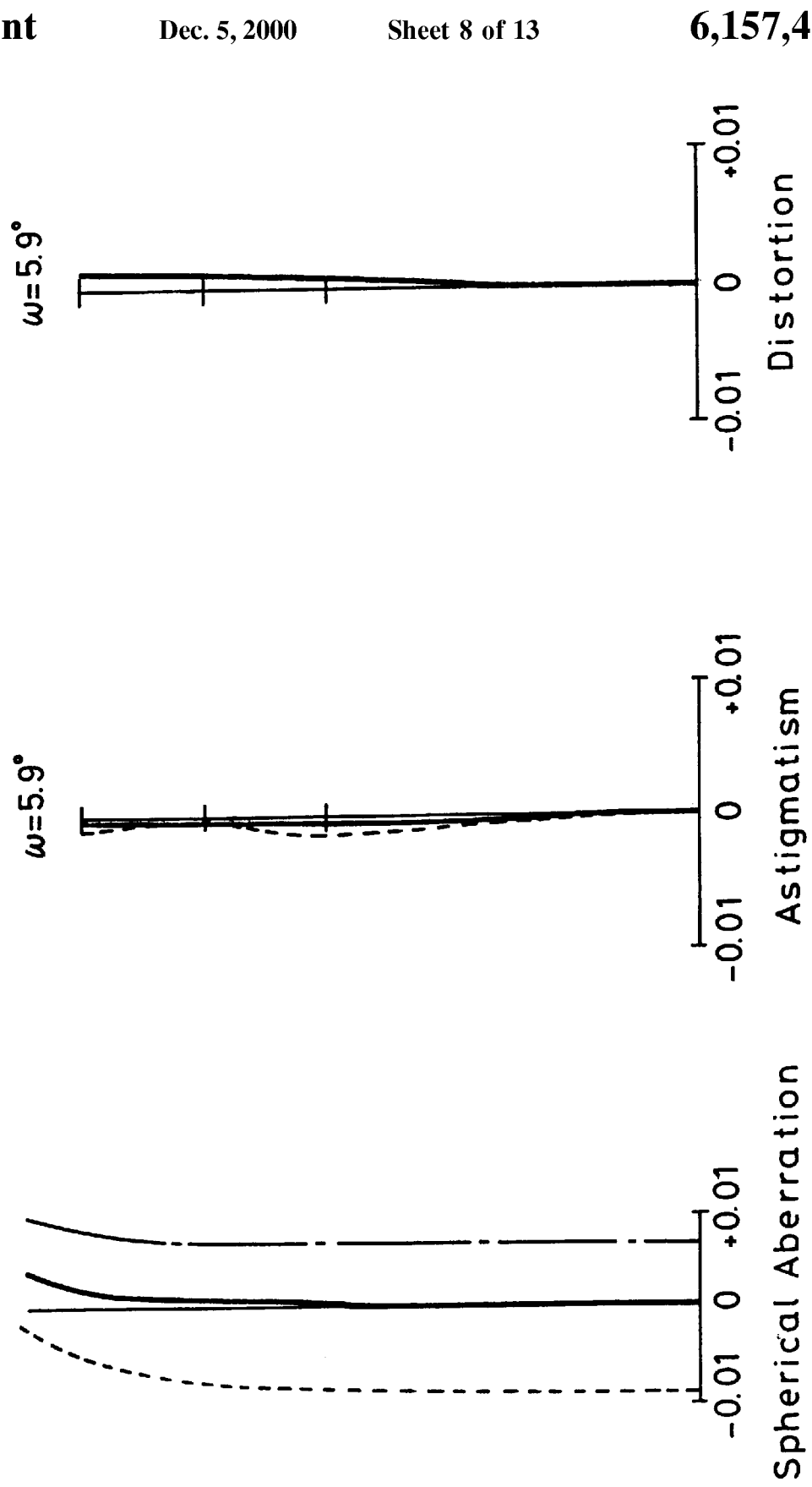

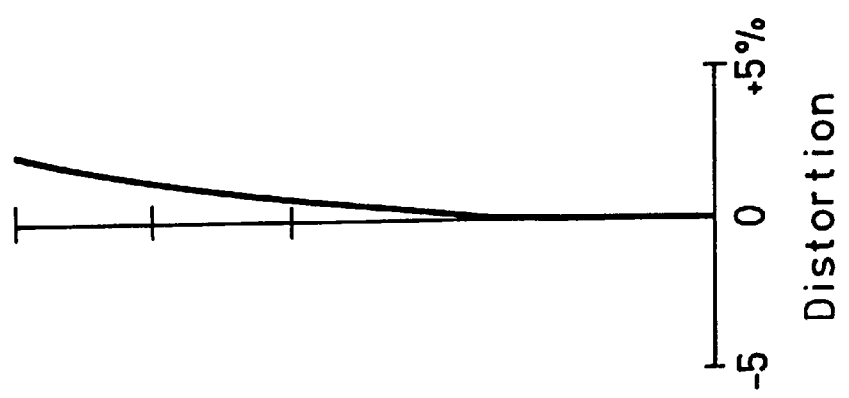
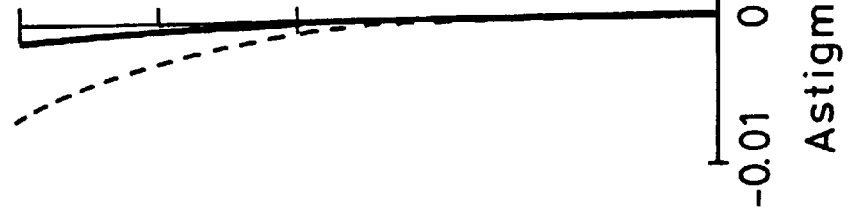
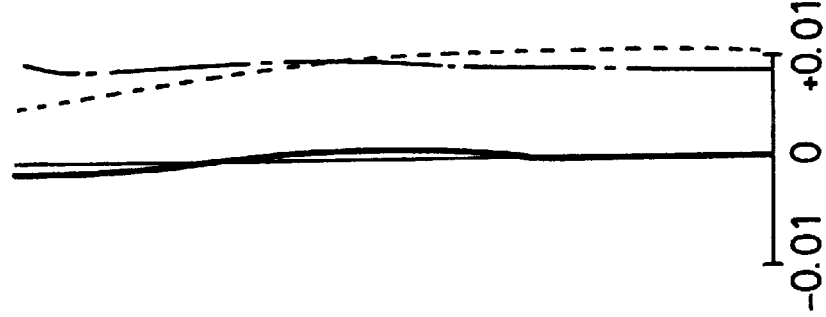

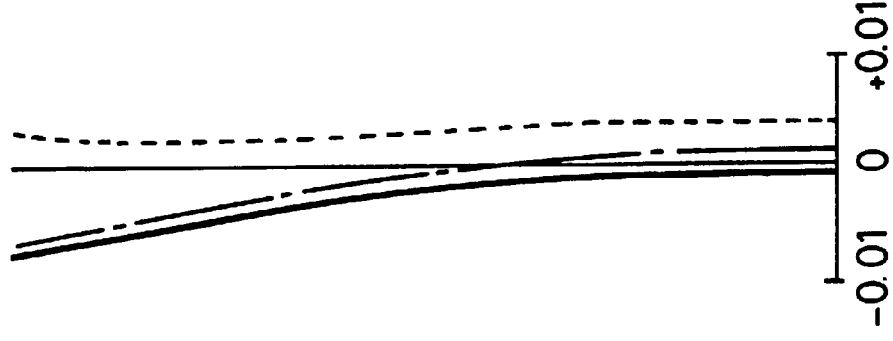

ZOOM LENS

BACKGROUND OF THE INVENTION

1. Field of the Invention

The present invention relates to a compact imaging apparatus, and in particular to a zoom lens most suitably used with a digital still camera.

2. Description of the Related Art

A conventional zoom lens such as a zoom lens of inner focus type for the video camera is configured of a lens system including, arranged from the object side, four lens groups having positive, negative, positive and positive refracting power in that order in many cases.

The zoom lens a shown in FIG. 1, for example, is configured of four lens groups for a total of nine lenses, including, from the object side, a first lens group Gr1 having three lenses with a positive refractive index as a whole, a second lens group Gr2 having three lenses with a negative refractive power as a whole adapted to move along the optical axis for magnification change, a third lens group Gr3 having a single lens with a positive refracting power and a fourth lens group Gr4 having two lenses with a positive refracting power as a whole.

The conventional zoom lens for the video camera, however, has the following problem if used for the still camera.

The following imaging quality is required of the video camera used for picking up a moving image or image sequences and the still camera used for taking a static image. In a still camera for taking a static image and often printing it out on the paper, the image printed out is observed in detail up to the high-frequency band, so that many pixels are required of the imaging apparatus and a high modulation transfer function (MTF) value is required up to a high-frequency band for the lens system performance. Assuming that a video camera using a ¼-inch CCD having a pixel pitch of 5.5 $\mu$m and MTF of 50 line·pair/mm, for example, the pixel pitch is 3.125 $\mu$m and the MTF of 90 line·pair/mm for a digital still camera using the same ¼-inch CCD. In the case where the number of pixels of the digital still camera exceeds one million in this way, it is difficult to maintain the same MTF value at a high spatial frequency.

Various zoom lenses having a lens configuration different from that of the zoom lens a shown in FIG. 1 for the video camera to pick up image sequences have been proposed. The main object of these lenses, however, is to reduce the size and there have been very few cases in which the basic configuration of the lens system is reviewed for the purpose of improving the image quality.

The problem of the conventional zoom lens a in respect of the image quality has been that of correction of the chromatic aberration. Specifically, the chromatic aberration on the axis at the wide angle edge of the zoom lens is effectively corrected in the third or fourth lens group where the light fluxes widen. In the zoom lens a described above, therefore, the third lens group Gr3 is configured of a single lens for reducing the cost and the chromatic aberration on the axis is corrected by the fourth lens group Gr4 in such a manner as to assure the balance of the whole lens system. The fourth lens group Gr4, in which the chromatic aberration is corrected when the height of the main light ray increases, is effective also for the correction of the chromatic aberration of magnification.

The fourth lens group Gr4 moves along a convex locus toward the object when the second lens group Gr2 is moved linearly for magnification change. In the case where an arrangement is made to assure the highest effect of correcting the chromatic aberration on the axis at a position farthest from the image surface and to assure a satisfactory effect at the wide angle edge, the effect of correcting the chromatic aberration on the axis becomes excessive at the position described above, thereby leading to the blur of the color having a short wavelength. As for the chromatic aberration of magnification, on the other hand, once the fourth lens group Gr4 reaches a position farthest from the image surface, the height of the main light ray is lowered so that the color of short wavelength tends to blur inward of the image. Mainly for the reason of these variations of the effect of chromatic aberration correction described above, the demand for the quality of a static image has failed to be met.

The zoom lens a is configured to maintain the balance of various aberrations on the wide angle side by offsetting the various aberrations of the first lens group Gr1 and the second lens group Gr2 at the telephotographic edge. As for the chromatic aberration, however, the blur of the color of short wavelength generated out of the axis from the joint surface of lenses constituting the first lens group Gr1 cannot be offset by the second lens group Gr2. This constitutes a factor for determining the image quality at the telephotographic edge. Also, in the case where the first lens group Gr1 is configured of three lenses like the zoom lens a, the freedom of the radius of curvature of the joint surface is limited by the balance between the freedom of selecting an optical glass to be used and the correction of other aberrations, thereby making it impossible to effectively correct the blur of the color of short wavelength at the telephotographic edge.

SUMMARY OF THE INVENTION

Accordingly, an object of the present invention is to provide a zoom lens high in image quality with various aberrations improved in a way most suitable for use with a still camera.

In order to achieve the object described above, according to the present invention, there is provided a zoom lens comprising, sequentially from the object side toward the image surface, a first lens group having a positive refracting power, a second lens group having a negative refracting power and movable along the direction of the optical axis mainly for changing the magnification, a third lens group having a positive refracting power, a fourth lens group having a positive refracting power and movable along the direction of the optical axis for correcting the change in the image position due to the magnification change while at the same time focusing the image, and a fifth lens group having a substantially zero refracting power, wherein the third lens group is composed of a joint lens including a convex lens and a concave lens, the fifth lens group is composed of a joint lens including a concave lens and a concave lens, and the conditions $-0.018<1/\upsilon 3<0.018$, $10<|\upsilon 5.1-\upsilon 5.2|$ and $1<|r5.2/fW\cdot \tan \omega W|<3$ are satisfied, where $\upsilon 3$ is the equivalent Abbe's number of the third lens group, $\upsilon 5.1$ is the Abbe's number of the lens of the fifth lens group nearer to the object, $\upsilon 5.2$ is the Abbe's number of the lens of the fifth lens group nearer to the image surface, $r5.2$ is the radius of curvature of the joint lens surface of the fifth lens group, $fW$ is the focal length of the whole lens system at the wide angle edge, and $\omega W$ is the half field angle at the wide angle edge.

According to the present invention, therefore, it is possible to reduce the variations of chromatic aberrations in the process of zooming and thus to provide a zoom lens of high image quality and improved in various aberrations in a way most suitable for use with a still camera.

BRIEF DESCRIPTION OF THE DRAWINGS

FIG. 3 is a diagram showing the spherical aberration, the astigmatism and the distortion at the wide angle edge;

FIG. 4 is a diagram showing the spherical aberration, the astigmatism and the distortion at the intermediate focal point between the wide angle edge and the telephotographic edge;

FIG. 5 is a diagram showing the spherical aberration, the astigmatism and the distortion at the telephotographic edge;

FIG. 8 is a diagram showing the spherical aberration, the astigmatism and the distortion at the intermediate focal point between the wide angle edge and the telephotographic edge;

FIG. 9 is a diagram showing the spherical aberration, the astigmatism and the distortion at the telephotographic edge;

FIG. 11 is a diagram showing the spherical aberration, the astigmatism and the distortion at the wide angle edge;

DESCRIPTION OF THE PREFERRED EMBODIMENTS

Figure 1:
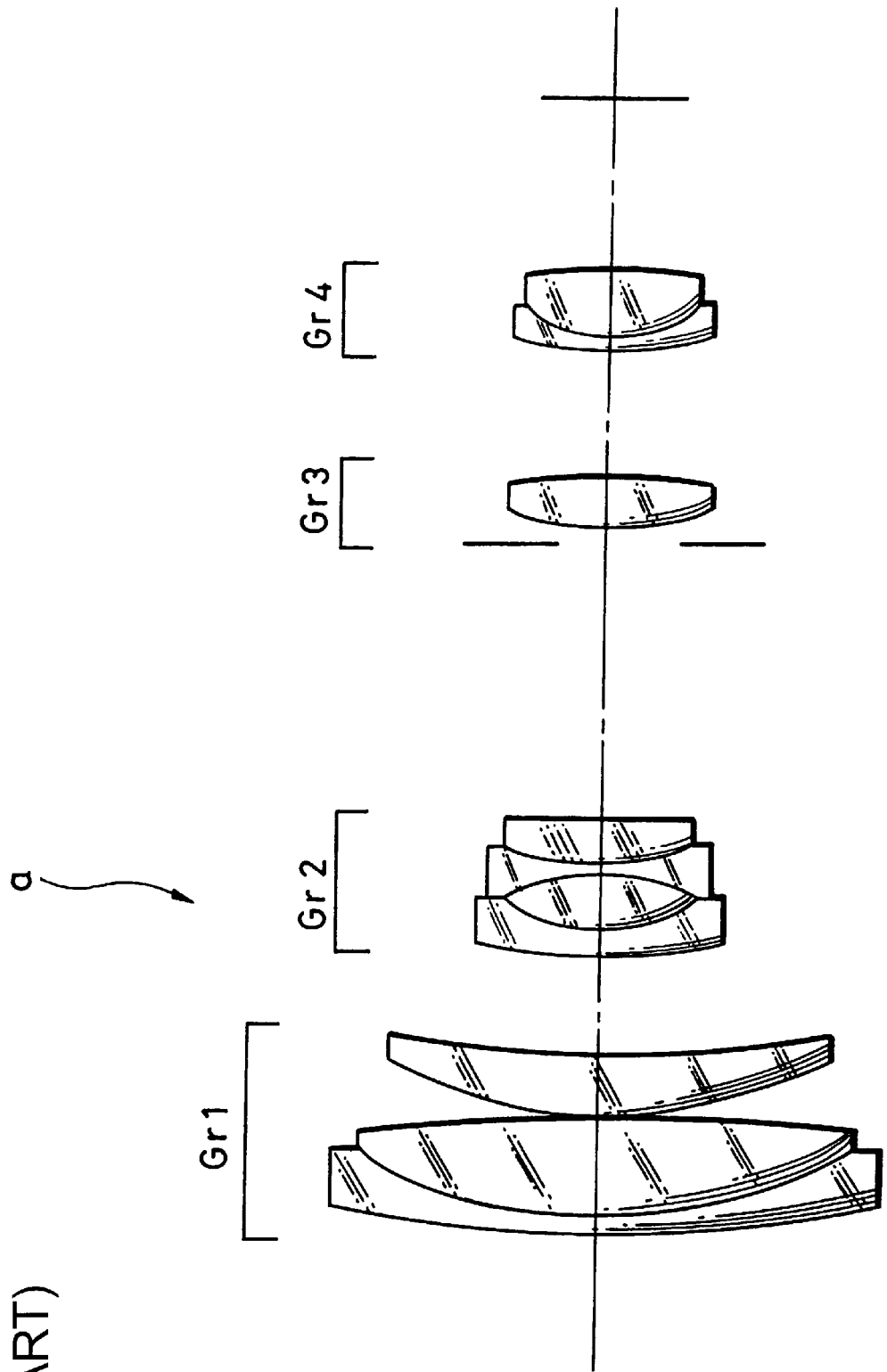
FIG. 1 is a diagram showing an example of the conventional zoom lens.

A zoom lens according to embodiments of the present invention will be explained below with reference to the accompanying drawings. FIGS. 2 to 5 show a first embodiment (numeric example 1), FIGS. 6 to 9 a second embodiment (numeric example 2) and FIGS. 10 to 13 a third embodiment (numeric example 3).

First, common items to the above-mentioned embodiments will be explained.

In the description that follows, "si.j" designates the jth surface of the ith lens group as counted from the object side, "ri.j" the radius of curvature of si.j, "di.j" the surface interval on the optical axis between si.j and si.j+1, "ni.j" the refractive index of the jth lens, as counted from the object side, of the ith lens group, and "υi.j" the Abbe's number of the jth lens, as counted from the object side, of the ith lens group, respectively.

The aspherical surface shape is defined as $$xi.j = H^2/ri.j\{1+\sqrt{(1-H^2/ri.j^2)}\} + \Sigma A k H^k$$

where xi.j is the depth of the aspherical surface, H the height from the optical axis and Ak the aspherical surface coefficient on the kth order.

The zoom lens 1, 1A and 1B according to the first to third embodiments comprises a lens system of five groups including, sequentially from the object side toward the image surface, a first lens group Gr1 having a positive refracting power, a second lens group Gr2 having a negative refracting power and movable along the direction of the optical axis primarily for changing the magnification, a third lens group Gr3 having a positive refracting power, a fourth lens group Gr4 having a positive refracting power and movable along the direction of the optical axis for correcting the change in the image position due to the magnification change while at the same time focusing the image, and a fifth lens group Gr5 having a substantially zero refracting power. The third lens group Gr3 is composed of a joint lens including a convex lens and a concave lens, and the fifth lens group Gr5 is composed of a joint lens including a concave lens and a convex lens.

This zoom lens is configured to satisfy the conditions $-0.018 < 1/\upsilon 3 < 0.018$ (hereinafter referred to as "the conditional equation 1"), $10 < |\upsilon 5.1 - \upsilon 5.2|$ (hereinafter referred to as "the conditional equation 2") and $1 < |r5.2/fW \cdot \tan \omega W| < \upsilon 3$ (hereinafter referred to as "the conditional equation 3"), where $\upsilon 3$ is the equivalent Abbe's number of the third lens group Gr3, fW is the focal length of the whole lens system at the wide angle edge, and W is the half angle of view at the wide angle edge.

The equivalent Abbe's number $\upsilon 3$ of the third lens group Gr3 is the value obtained by substituting a thin single lens by a joint lens for convenience' sake from the relations $1/f3 = 1/f3.1 + 1/f3.2$ and $1/f3 \cdot \upsilon 3 = 1/f3.1 \cdot \upsilon 3.1 + 1/f3.2 \cdot \upsilon 3.2$, where f3 is the combined focal length of the third lens group Gr3, and f3.1, f3.2, $\upsilon 3.1$ and $\upsilon 3.2$ are the focal length and the Abbe's number of the convex lens and concave lens, respectively, constituting the third lens group Gr3.

Specifically, the zoom lenses 1, 1A and 1B are intended for correcting the chromatic aberration on the axis mainly by the fixed third lens group Gr3 and correcting the chromatic aberration of magnification mainly by the fixed fifth lens group Gr5 having a large height of the main light ray at the wide angle side. In this way, the lens group for correcting the chromatic aberration is not moved during zooming and therefore the variations of the chromatic aberration during zooming can be reduced.

The conditional equation 1 described above defines the condition on which the chromatic aberration on the axis at the wide angle side can be corrected by the third lens group Gr3.

Specifically, the value $1/\upsilon 3$ is defined within the range indicated by the conditional equation 1 is by reason of the fact that once the value $1/\upsilon 3$ exceeds the upper limit, the chromatic aberration on the axis cannot be sufficiently corrected by the third lens group Gr3 and the complementation by the fourth lens group Gr4 or the fifth lens group Gr5 is necessary, thereby causing variations in the chromatic aberration on the axis with individual zooming operations or the balance with the chromatic aberration of magnification is collapsed. In the case where the value $1/\upsilon 3$ is reduced below the lower limit, on the other hand, the correction of the chromatic aberration on the axis at the wide angle side becomes excessive.

The conditional equation 2 and the conditional equation 3 define the conditions for permitting the fifth lens group Gr5 to correct the chromatic aberration of magnification, where the value $fW \cdot \tan \omega W$ corresponds to the maximum image height.

Specifically, the values $|\upsilon 5.1 - \upsilon 5.2|$ and $|r5.2/fW \cdot \tan \omega W|$ are defined by the conditional equations 2 and 3, respectively, by reason of the fact that the effect of correction of the chromatic aberration of magnification cannot be achieved unless the difference of the Abbe's number between the convex lens and the concave lens constituting the fifth lens group Gr5 is sufficiently increased as defined in the conditional equation 2 and the radius of curvature of the joint surface is reduced below the upper limit as defined in the conditional equation 3 and also in view of the fact that in the case where the radius of curvature of the joint surface between the convex lens and the concave lens constituting the fifth lens group Gr5 is decreased below the lower limit, in contrast, the resulting substantial hemisphere makes fabrication of the apparatus difficult.

As described above, the chromatic aberration of magnification is corrected by adding the fifth lens group Gr5, and therefore it has become possible to prevent the chromatic aberration of magnification from changing extremely with the movement of the fourth lens group Gr4.

The zoom lenses 1A and 1B according to the second and third embodiments, on the other hand, comprise the first lens group Gr1 constituted of four lenses including, from the object side, a joint lens of a concave lens and a convex lens, a convex lens and a convex meniscoid lens with the convex surface thereof facing toward the object in that order, and is adapted to satisfy the relation $0.49 < |r1.2/fT| < 0.65$ (hereinafter referred to as "the conditional equation 4"), where r1.2 is the radius of curvature of the joint surface of the joint lens of the first lens group and fT is the focal length of the whole lens system at the telephotographic edge.

The conditional equation 4 defines the radius of curvature of the joint surface r1.2 for suppressing the blur of the color of a short wavelength at the telephotographic edge generated from the first lens group Gr1, i.e. the joint surface r1.2 between the lens L1 and the lens L2.

In the case where an achromatic lens is configured of three lenses of the first lens group Gr1 like the conventional zoom lens shown in FIG. 1, the radius of curvature of the joint surface becomes excessive thereby making it difficult to improve the blur of the color of a short wavelength.

In the zoom lenses 1A and 1B, therefore, the first lens group Gr1 is constituted of four lenses and the value $|r1.2/fT|$ defining the radius of curvature of the joint surface r1.2 is set in the range indicated by the conditional equation 4. In this way, the blur of the color of the short wavelength is improved. Once the value $|r1.2/fT|$ exceeds the upper limit, the chromatic aberration generated from the first lens group Gr1 and the spherical aberration at the telephotographic edge cannot be easily corrected.

The four-lens configuration of the first lens group Gr1 as described above makes it possible to improve the blur of the color at the telephotographic edge while at the same time making possible a well balanced correction of the chromatic aberration over the entire range of zooming.

It is the requirement of the present invention to avoid an excessive achromatic configuration of the fourth lens group Gr4 in order to suppress the variations of chromatic aberration in zooming. The fourth lens group Gr4, therefore, can be configured of either a single lens or an achromatic lens.

In the zoom lens 1 according to the first embodiment and the zoom lens 1A according to the second embodiment, the fourth lens group Gr4 is constituted of a single lens.

In the case where the fourth lens group Gr4 is constituted of a single lens, it is necessary that the Abbe's number υ4.1 of the particular single lens is set equal to or more than 50. Specifically, in the case where υ4.1 is equal to or less than 50, the correction of the chromatic aberration on the axis becomes insufficient when the fourth lens group Gr4 moves toward the object, thereby making it impossible to correct the likelihood of blurring of short wavelength color downward also for the chromatic aberration of magnification.

The zoom lens 1B according to the third embodiment includes the fourth lens group Gr4 constituted of a joint lens of a concave lens and a convex lens. In this case, assuming that the equivalent Abbe's number of the fourth lens group is υ4, the relation $-0.018 < 1/υ4 < 0.018$ (hereinafter referred to as "the conditional equation 5") is satisfied.

The equivalent Abbe's number υ4 of the fourth lens group Gr4 is a value obtained by substituting a thin single lens with a joint lens for convenience' sake based on $1/f4 = 1/f4.1 + 1/f4.2$ and $1/f4 \cdot υ4 = 1/f4.1 \cdot υ4.1 + 1/f4.2 \cdot υ4.2$, where f4 is the combined focal length of the third lens group Gr3, and f4.1, f4.2, υ4.1 and υ4.2 are the focal length and Abbe's numbers of the concave lenses and the convex lenses, respectively, constituting the fourth lens group Gr4.

Specifically, in the case where the fourth lens group Gr4 is constituted of a single lens, the variations of the chromatic aberration due to the movement of the fourth lens group Gr4 remain unremoved, and for this to be improved further, it is effective to form the fourth lens group Gr4 with an achromatic lens unit of two lenses.

The conditional equation 5 defines the conditions for forming an achromatic lens of the fourth lens group Gr4 and $1/υ4 \approx 0$ is desirable. The value $1/υ4$ is defined to be included in the range of the conditional equation 5 by reason of the fact that if the value $1/υ4$ exceeds the upper limit, the situation becomes similar to the case where the fourth lens group Gr4 is a single lens, thereby making it difficult to achieve an apparent improvement, and that if the value $1/υ4$ is decreased below the lower limit, on the other hand, the variations of the chromatic aberration on the axis due to the movement of the fourth lens group Gr4 by zooming become conspicuous.

In this way, an excessive burden for achromatic configuration is prevented from being imposed on the fourth lens group Gr4 which is movable along the direction of the optical axis for correcting the movement of the image position due to the magnification change at the time of zooming on the one hand and for focusing on the other hand. It is thus possible both to avoid excessive correction of the chromatic aberration on the axis in the range of intermediate focal length and to reduce the variations of the chromatic aberration on the axis and the chromatic aberration of magnification by forming an appropriate achromatic lens of the fourth lens group Gr4.

The fifth lens group Gr5 is a lens system including a concave lens with a flat surface facing toward the object and a convex lens with a flat surface facing toward the image surface combined with each other on the curved surfaces thereof, i.e. what is called a combined lens with parallel flat surfaces in which the difference of refractive index on the d line between the concave and concave lenses is set equal to or less than 0.05.

By configuring the fifth lens group Gr5 of a parallel flat joint lens of substantially zero refractive index as described above, the aberration of the single color can be avoided otherwise than the effect of the thickness thereof.

Also, even in the case where this configuration of the fifth lens group Gr5 causes a parallel decentration due to a position error on the optical axis of the fifth lens group Gr5 with respect to the coincident optical axes of the first lens group Gr1 to the fourth lens group Gr4, the optical characteristics other than the chromatic aberration of the zoom lenses 1, 1A to 1B are not affected. Thus, the sensitivity to the decentration error of the optical axis of the fifth lens group Gr5 can also be considerably relaxed.

Further, what are called the centered lenses are coupled to each other normally by measuring the angle of deviation of the transmitting light with reference to the contour of one of the lenses. In the parallel flat joint lens constituting the fifth lens group Gr5, however, a parallel flat lens is sandwiched between the two surfaces high in parallelism before the adhesive for coupling the joint surfaces is hardened. Then by hardening the adhesive, the coupling job is not required based on the lens contour nor the optical inspection. Thus, the process of coupling the lenses can be simplified.

In the zoom lenses 1, 1A and 1B, the fifth lens group Gr5 is not necessarily configured of the parallel flat joint lens, but an achromatic lens having a substantially zero refracting power can achieve one of the objects of the present invention and permits correction of the chromatic aberration of magnification using a fixed lens group.

The lenses making up the third lens group Gr3 and the lenses making up the fourth lens group Gr4 have at least one of the lens surfaces configured in aspherical form.

The use of an aspherical surface in the third lens group Gr3 and the fourth lens group Gr4 is effective for correcting the spherical aberration and the coma aberration in view of the fact that the third lens group Gr3 is arranged adjacently to the stop IR on the one hand, and effective mainly for correcting the astigmatism and the variations of the coma aberration in view of the fact that the fourth lens group Gr4 is conversely distant from the stop IR and movable while having a high main light ray height.

Now, each embodiment will be described in detail.

Figure 2:
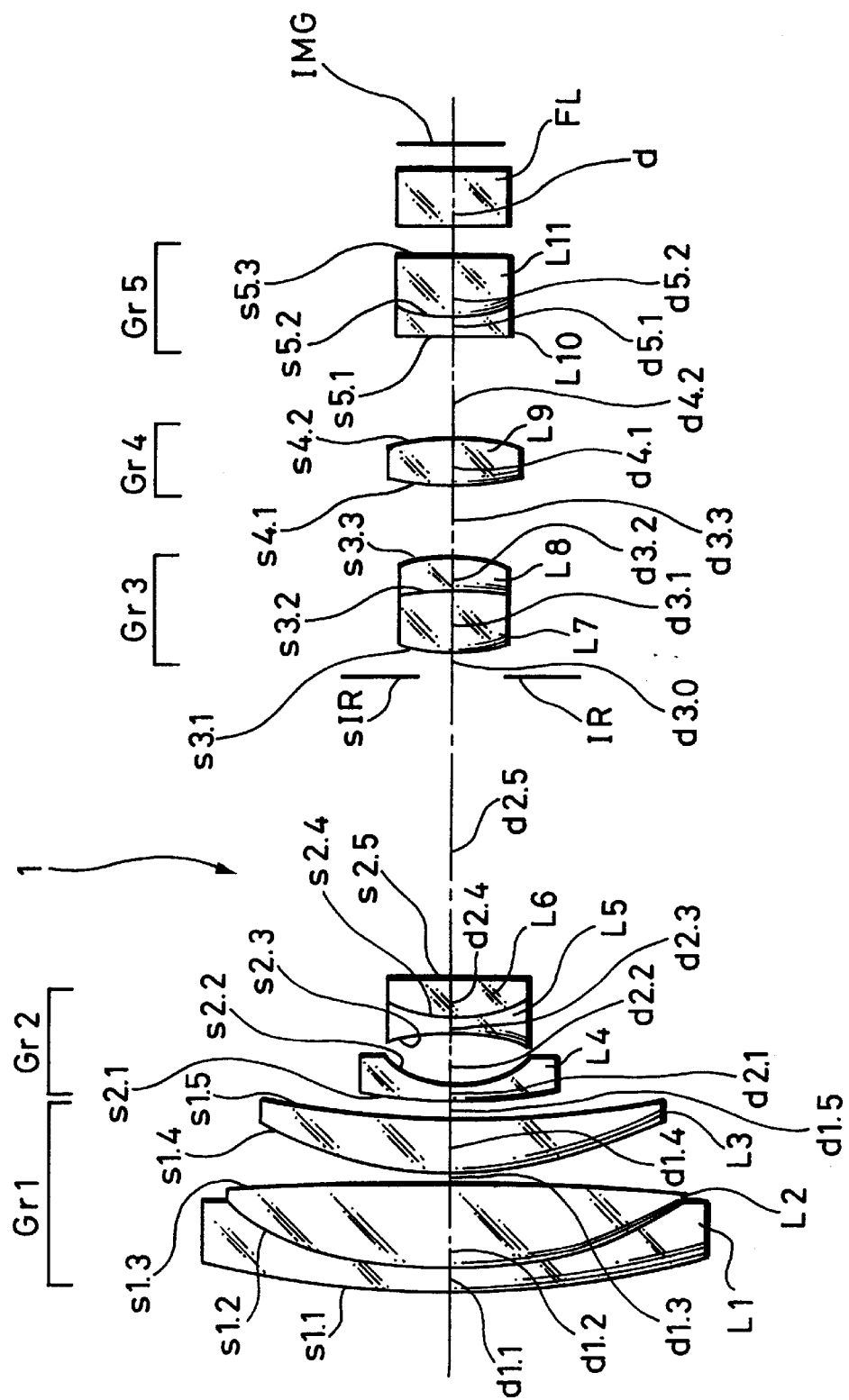
FIG. 2 is a diagram schematically showing, together with FIGS. 3 to 5, a lens arrangement of a zoom lens according to a first embodiment of the present invention.

The zoom lens 1 according to the first embodiment is configured of 11 lenses as shown in FIG. 2.

The first lens group Gr1 has a positive refracting power as a whole and includes three lenses of L1 to L3. The lenses L1 and L2, which have a concave surface and a convex surface of the same radius of curvature, respectively, facing toward the image surface side and the object side, are coupled to form a joint lens having the joint surface s1.2.

The second lens group Gr2 has a negative refracting power as a whole and includes three lenses L4 to L6. The second lens group Gr2 is movable in position along the optical axis and primarily adapted to change the magnification. The lenses L5 and L6 make up a joint lens by being coupled to each other on the surface s2.4.

The third lens group Gr3, on the other hand, has a positive refracting power as a whole and includes two lenses, a convex lens L7 and a concave lens L8. The lenses L7 and L8 are coupled with each other by the convex and concave surfaces thereof having the same radius of curvature and facing toward the image surface side and the object side, respectively, thereby making up a joint lens having a joint surface s3.2.

The fourth lens group Gr4 is configured of a single lens L9 having a positive refracting power, and adapted to move in position along the optical axis thereby to correct the variations of the image position due to the magnification change while at the same time focusing the image.

Further, the fifth lens group Gr5 has a substantially zero refracting power as a whole and includes two lenses, a concave lens L10 and a convex lens L11. The lenses L10 and L11 have flat surfaces s5.1 and s5.3 thereof facing toward the object side and the image surface side, respectively, in which the convex and concave surfaces having the same radius of curvature are coupled to each other thereby to configure a joint lens having a joint surface s5.2.

A stop IR is interposed between the second lens group Gr2 and the third lens group Gr3, and a filter FL interposed between the fifth lens group Gr5 and the image surface (imaging surface) IMR.

Also, the zoom lens 1 satisfies the conditional equations 1 to 3 described above. Table 1 shows the various values of the zoom lens 1.

TABLE 1

| r1.1 = 12.3103 | d1.1 = 0.2733 | n1.1 = 1.84666 | v1.1 = 23.8 |
| r1.2 = 4.7275 | d1.2 = 1.0221 | n1.2 = 1.69680 | v1.2 = 55.5 |
| r1.3 = −65.9617 | d1.3 = 0.0641 | | |
| r1.4 = 4.4615 | d1.4 = 0.6542 | n1.3 = 1.80420 | v1.3 = 46.5 |
| r1.5 = 12.8156 | d1.5 = variable | | |
| r2.1 = 5.6104 | d2.1 = 0.1922 | n2.1 = 1.83500 | v2.1 = 43.0 |
| r2.2 = 1.3056 | d2.2 = 0.5485 | | |
| r2.3 = −1.8182 | d2.3 = 0.1922 | n2.2 = 1.80610 | v2.2 = 40.7 |
| r2.4 = 1.3423 | d2.4 = 0.4565 | n2.3 = 1.84666 | v2.3 = 23.8 |
| r2.5 = −9.8497 | d2.5 = variable | | |
| Stop = ∞ | d3.0 = 0.3204 | | |
| r3.1 = 2.2842 | d3.4 = 0.6893 | n3.1 = 1.58913 | v3.1 = 61.3 |
| r3.2 = −4.8055 | d3.2 = 0.2883 | n3.2 = 1.84666 | v3.2 = 23.8 |
| r3.3 = 37.3006 | d3.3 = variable | | |
| r4.1 = 6.4195 | d4.1 = 0.4980 | n4.1 = 1.58913 | v4.1 = 61.3 |
| r4.2 = −2.6213 | d4.2 = variable | | |
| r5.1 = ∞ | d5.1 = 0.1922 | n5.1 = 1.62004 | v5.1 = 36.3 |
| r5.2 = 0.9611 | d5.2 = 0.7208 | n5.2 = 1.62041 | v5.2 = 60.3 |
| r5.3 = ∞ | | | |
| Filter ∞ ∞ | d = 0.6223 | n = 1.51680 | v = 64.2 |

Table 2 shows the values of the surface intervals d1.5, d2.5, d3.3 and d4.2 changing with the zooming at the wide angle edge (f=1.00), the intermediate focal length (f=4.68) and the telephotographic edge (f=9.80).

TABLE 2

| Focal length | 1.00 | 4.68 | 9.80 |
| --- | --- | --- | --- |
| d1.5 | 0.2563 | 2.6990 | 3.5153 |
| d2.5 | 3.7075 | 1.2648 | 0.4485 |
| d3.3 | 1.0208 | 0.3689 | 1.0809 |
| d4.2 | 1.2088 | 1.8608 | 1.1488 |

Also, the surfaces s3.1 and s4.2 are configured in aspherical form. Thus, Table 3 shows the fourth- and sixth-order aspherical coefficients A4 and A6 of the surfaces described above.

TABLE 3

| Aspherical surface coefficient | A4 | A6 |
| --- | --- | --- |
| r3.1 | −0.1686E-01 | 0.5332E-03 |
| r4.2 | 0.2614E-01 | 0.7163E-04 |

In Table 3, "E" designates an exponential expression with base 10 (this is also the case with Tables 7 and 11 described later).

Table 4 shows the focal length (f), the open F number (FNo.), the field angle (2ω), the conditional equations 1 to 3 (conditional equation 4 by way of reference) and the values of f3.1, f3.2 and f3 of the whole lens system of the zoom lens 1.

TABLE 4

| |v5.1−v5.2| | 24.0 |
| --- | --- |
| |r5.2/fW · tanωW| | 1.6987 |
| |r1.2|fT| | 0.4824 |
| f3.1 | 2.7263 |
| f3.2 | −5.0123 |
| f3 | 5.9777 |
| 1/v3 | −0.0143 |
| f | 1.0–9.8 |
| FNo. | 2.8–3.2 |
| 2ω | 59°–6.2° |

FIGS. 3 to 5 are a spherical aberration diagram, an astigmatism diagram and a distortion diagram, respectively, at the wide angle edge, the intermediate focal length and the telephotographic edge of the zoom lens 1. In the spherical aberration diagram, the solid line indicates the values on the d line, the dashed line those on the g line (wavelength 435.8 nm) and the one-dot chain those on the C line (wavelength 656.3 nm). In the astigmatism diagram, on the other hand, the solid line indicates the values on the sagittal image surface and the dashed line those on the meridional image surface.

Figure 6:
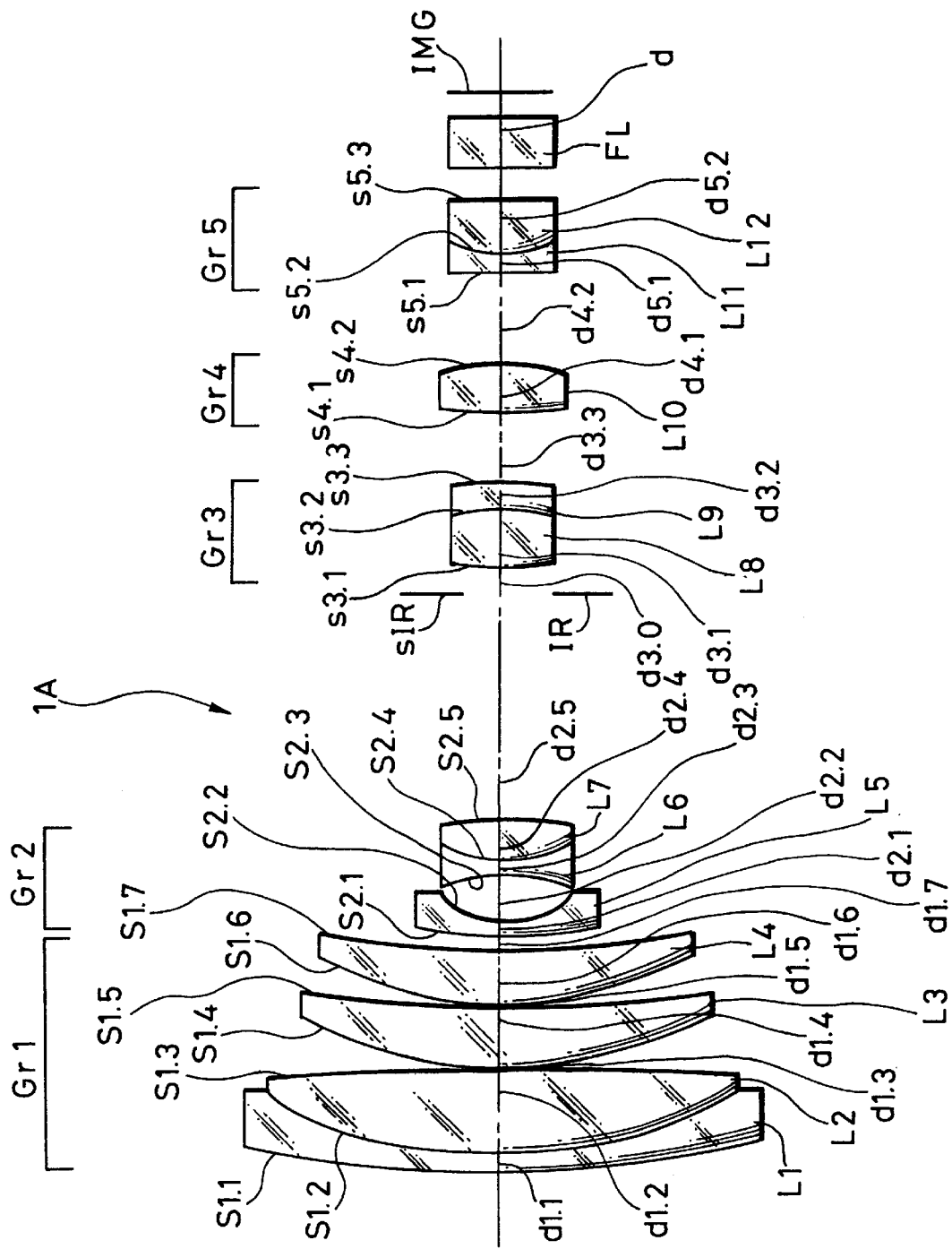
FIG. 6 is a diagram schematically showing, together with FIGS. 7 to 9, a lens arrangement of a zoom lens according to a second embodiment of the present invention.

The zoom lens 1A according to the second embodiment, as shown in FIG. 6, is configured of 12 lenses.

The first lens group Gr1 has a positive refracting power as a whole and is configured of four lenses including, from the object side, a concave lens L1, a convex lens L2, a convex lens L3 and a convex meniscoid lens L4 arranged in that order. The lenses L1 and L2, which have the concave and convex surfaces thereof facing toward the object side and the image surface side, respectively, and the same radius of curvature, are coupled to each other to configure a joint lens having the joint surface s1.2.

The second lens group Gr2 has a negative refracting power as a whole and is configured of three lenses L5 to L7. The second lens group Gr2 is movable in position along the direction of the optical axis and primarily changes the magnification. The lenses L6 and L7 constitute a joint lens coupled to each other on the surface s2.4.

The third lens group Gr3 has a positive refracting power as a whole, and is configured of two lenses, a convex lens L8 and a concave lens L9. The lenses L8 and L9, which have the convex and concave surfaces of the same radius of curvature and facing toward the image surface side and the object side, respectively, are coupled to each other to form a joint lens having a joint surface s3.2.

The fourth lens group Gr4 is configured of a single lens L10 having a positive refracting power and movable in position along the optical axis thereby to correct the variations of the image position due to the magnification change while at the same time focusing the image.

Further, the fifth lens group Gr5 has a substantially zero refracting power as a whole and is configured of two lenses, a concave lens L11 and a convex lens L12. The lenses L11 and L12, which have flat surfaces s5.1 and s5.3 facing toward the object side and the image surface side, respectively, and also concave and convex surfaces of the same radius of curvature facing toward the object side and the image surface side, respectively, are coupled with each other to form a joint lens having a joint surface s5.2.

A stop IR is interposed between the second lens group Gr2 and the third lens group Gr3, and a filter FL between the fifth lens group Gr5 and the image surface (imaging surface) IMR.

Also, the zoom lens 1A satisfies the conditional equations 1 to 4 described before.

Table 5 shows the respective values of the zoom lens 1A.

TABLE 5

| r1.1 = 18.0269 | d1.1 = 0.2559 | n1.1 = 1.75520 | v1.1 = 17.5 |
| r1.2 = 5.6609 | d1.2 = 1.1602 | n1.2 = 1.51680 | v1.2 = 64.2 |
| r1.3 = −49.6756 | d1.3 = 0.0453 | | |
| r1.4 = 5.3331 | d1.4 = 0.8333 | n1.3 = 1.51680 | v1.3 = 64.2 |
| r1.5 = 45.2429 | d1.5 = 0.0453 | | |
| r1.6 = 4.6054 | d1.6 = 0.6006 | n1.4 = 1.52680 | v1.4 = 64.2 |
| r1.7 = 10.8285 | d1.7 = variable | | |
| r2.1 = 5.5912 | d2.1 = 0.1811 | n2.1 = 1.83500 | v2.1 = 43.0 |
| r2.2 = 1.3122 | d2.2 = 0.5855 | | |

TABLE 5-continued

| r2.3 = −1.6928 | d2.3 = 0.1359 | n2.2 = 1.78590 | v2.2 = 43.9 |
| r2.4 = 1.3974 | d2.4 = 0.4664 | n2.3 = 1.84666 | v2.3 = 23.8 |
| r2.5 = −10.4179 | d2.5 = variable | | |
| Stop = ∞ | d3.0 = 0.3019 | | |
| r3.1 = 2.7424 | d3.1 = 0.5637 | n3.1 = 1.58913 | v3.1 = 61.3 |
| r3.2 = −1.2558 | d3.2 = 0.2717 | n3.2 = 1.83400 | v3.2 = 37.3 |
| r3.3 = −4.8511 | d3.3 = variable | | |
| r4.1 = 7.3418 | d4.1 = 0.6198 | n4.1 = 1.58913 | v4.1 = 61.3 |
| r4.2 = −2.6349 | d4.2 = variable | | |
| r5.1 = ∞ | d5.1 = 0.1811 | n5.1 = 1.62004 | v5.1 = 36.3 |
| r5.2 = 0.9057 | d5.2 = 0.6793 | n5.2 = 1.62041 | v5.2 = 60.3 |
| r5.3 = ∞ | | | |
| Filter ∞ ∞ | d = 0.5865 | n = 1.51680 | v = 64.2 |

Table 6 shows the values of the surface intervals d1.7, d2.5, d3.3 and d4.2 changing with the zooming at the wide angle edge (f=1.00), the intermediate focal length (f=4.93) and the telephotographic edge (f=10.0), respectively.

TABLE 6

| Focal length | 1.00 | 4.93 | 10.00 |
| --- | --- | --- | --- |
| d1.7 | 0.2415 | 2.7414 | 3.5078 |
| d2.5 | 3.6890 | 1.1891 | 0.4227 |
| d3.3 | 1.0606 | 0.3786 | 1.0205 |
| d4.2 | 1.2686 | 1.9506 | 1.3087 |

Also, the surfaces s3.1 and s4.2 are configured in an aspherical form. Thus, Table 7 shows the fourth- and sixth-order aspherical surface coefficients A4 and A6 of the surfaces.

TABLE 7

| Aspherical surface coefficient | A4 | A6 |
| --- | --- | --- |
| r3.1 | 0.4010E-02 | 0.1039E-01 |
| r4.2 | 0.2258E-01 | 0.1981E-02 |

Table 8 shows the focal length (f), the open F number (FNo.), the field angle (2w), the conditional equations 1 to 4 and the values of f3.1, f3.2 and f3 of the whole lens system of the zoom lens 1A.

TABLE 8

| |v5.1−v5.2| | 24.0 |
| --- | --- |
| |r5.2/fW · tanωW| | 1.7106 |
| |r.1.2|fT| | 0.5661 |
| f3.1 | 1.5427 |
| f3.2 | −2.1040 |
| f3 | 5.7827 |
| 1/v3 | −0.0125 |
| f | 1.0~10.0 |
| FNo. | 2.8~3.2 |
| 2ω | 55.8°~5.8° |

Figure 7C:
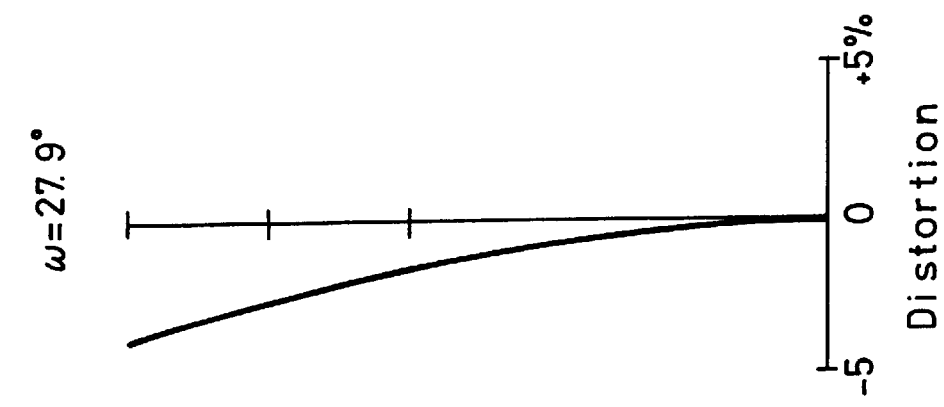
FIG. 7 is a diagram showing the spherical aberration, the astigmatism and the distortion at the wide angle edge.
Figure 7B:
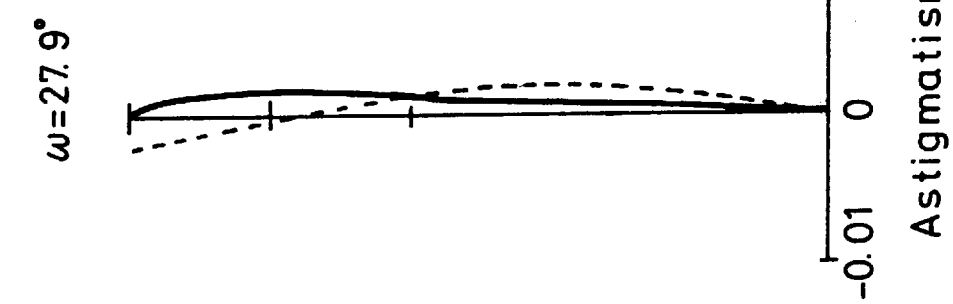
Figure 7A:
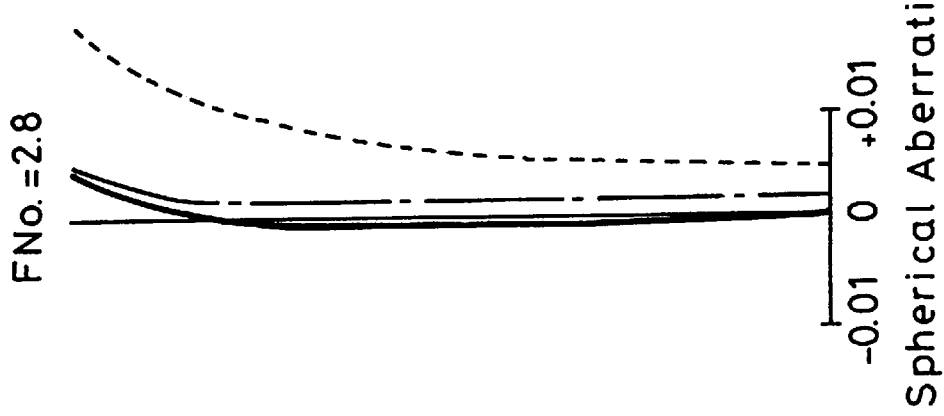

FIGS. 7 to 9 are a spherical aberration diagram, an astigmatism diagram and a distortion diagram, respectively, at the wide angle edge, the intermediate focal length and the telephotographic edge of the zoom lens 1A. In the spherical aberration diagram, the solid line indicates the values on the d line, the dashed line those on the g line and the one-dot chain those on the C line, respectively. In the astigmatism diagram, on the other hand, the solid line indicates the values on the sagittal image surface and the dashed line those on the meridional image surface.

Figure 10:
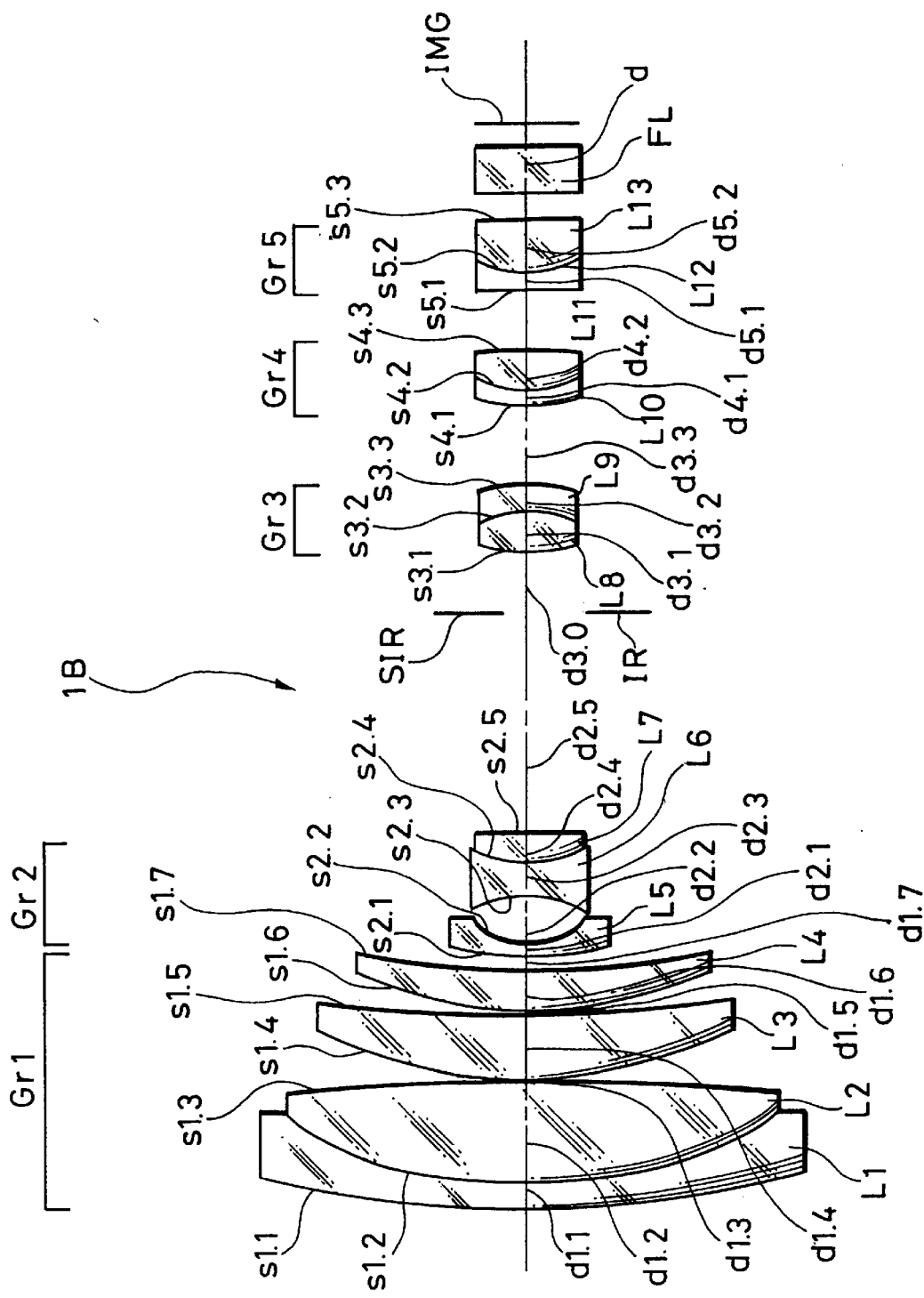
FIG. 10 is a diagram schematically showing, together with FIGS. 11 to 13, a lens arrangement of a zoom lens according to a third embodiment of the present invention.

The zoom lens 1B according to the third embodiment, as shown in FIG. 10, is configured of 13 lenses.

The first lens group Gr1 has a positive refracting power as a whole and is configured of four lenses including, from the object side, a concave lens L1, a convex lens L2, a convex lens L3 and a convex meniscoid lens L4 arranged in that order. The lenses L1 and L2, which have the concave and convex surfaces thereof having the same radius of curvature, facing toward the object side and the image surface side, respectively, are coupled to each other to configure a joint lens having the joint surface s1.2.

The second lens group Gr2 has a negative refracting power as a whole and is configured of three lenses L5 to L7. The second lens group Gr2 is movable in position along the direction of the optical axis and primarily changes the magnification. The lenses L6 and L7 constitute a joint lens by being coupled to each other on the surface s2.4.

The third lens group Gr3 has a positive refracting power as a whole, and is configured of two lenses, a convex lens L8 and a concave lens L9. The lenses L8 and L9, which have convex and concave surfaces of the same radius of curvature, facing toward the image surface side and the object side, respectively, are coupled to each other to form a joint lens having a joint surface s3.2.

The fourth lens group Gr4 has a positive refracting power as a whole and is configured of two lenses, a concave lens L10 and a convex lens L11. The lenses L10 and L11, which have concave and convex surfaces of the same radius of curvature facing toward the image surface side and the object side, respectively, are coupled to each other to form a joint lens having a joint surface s4.2. Also, the fourth lens group Gr4 is movable in position along the optical axis thereby to correct the variations of the image position due to the magnification change while at the same time focusing the image.

Further, the fifth lens group Gr5 has a substantially zero refracting power as a whole and is configured of two lenses, a concave lens L12 and a convex lens L13. The lenses L12 and L13, which have flat surfaces s5.1 and s5.3 facing toward the object side and the image surface side, respectively, and concave and convex surfaces of the same radius of curvature facing toward the image surface side and the object side, respectively, are coupled with each other to form a joint lens having a joint surface s5.2.

A stop IR is interposed between the second lens group Gr2 and the third lens group Gr3, and a filter FL between the fifth lens group Gr5 and the image surface (imaging surface) IMR, respectively.

Also, the zoom lens 1B satisfies the conditional equations 1 to 5 mentioned above.

Table 9 shows the respective values of the zoom lens 1B.

TABLE 9

| r1.1 = 19.1262 | d1.1 = 0.2631 | n1.1 = 1.75520 | v1.1 = 27.5 |
| r1.2 = 5.8205 | d1.2 = 1.4715 | n1.2 = 1.51680 | v1.2 = 64.2 |
| r1.3 = −25.8687 | d1.3 = 0.0466 | | |
| r1.4 = 4.9077 | d1.4 = 0.9625 | n1.3 = 1.51680 | v1.3 = 64.2 |
| r1.5 = 29.1023 | d1.5 = 0.0466 | | |
| r1.6 = 4.7313 | d1.6 = 0.5576 | n1.4 = 1.52680 | v1.4 = 64.2 |
| r1.7 = 9.0158 | d1.7 = variable | | |
| r2.1 = 10.7508 | d2.1 = 0.1863 | n2.1 = 1.83500 | v2.1 = 43.0 |
| r2.2 = 1.3288 | d2.2 = 0.5963 | | |
| r2.3 = −1.7138 | d2.3 = 0.4656 | n2.2 = 1.71300 | v2.2 = 53.9 |
| r2.4 = 1.9890 | d2.4 = 0.3633 | n2.3 = 1.84666 | v2.3 = 23.8 |
| r2.5 = −24.4483 | d2.5 = variable | | |
| Stop = ∞ | d3.0 = 0.3104 | | |
| r3.1 = 2.3458 | d3.1 = 0.5478 | n3.1 = 1.58913 | v3.1 = 61.3 |
| r3.2 = −1.6063 | d3.2 = 0.2794 | n3.2 = 1.83500 | v3.2 = 43.0 |
| r3.3 = −5.0428 | d3.3 = variable | | |
| r4.1 = 3.1363 | d4.1 = 0.1397 | n4.1 = 1.83400 | v4.1 = 37.3 |

TABLE 9-continued

| r4.2 = 1.4096 | d4.2 = 0.4939 | n4.2 = 1.58913 | v4.2 = 61.3 |
| r4.3 = −4.0546 | d4.3 = variable | | |
| r5.1 = ∞ | d5.1 = 0.1863 | n5.1 = 1.62004 | v5.1 = 36.3 |
| r5.2 = 0.9313 | d5.2 = 0.6985 | n5.2 = 1.62041 | v5.2 = 60.3 |
| r5.3 = ∞ | | | |
| Filter ∞ ∞ | d = 0.6030 | n = 1.51680 | v = 64.2 |

Table 10 shows the values of the surface intervals d1.7, d2.5, d3.3 and d4.3 changing with the zooming at the wide angle edge (f=1.00), the intermediate focal length (f=5.21) and the telephotographic edge (f=10.0), respectively.

TABLE 10

| Focal length | 1.00 | 5.21 | 10.00 |
| --- | --- | --- | --- |
| d1.7 | 0.2483 | 2.8246 | 3.4761 |
| d2.5 | 3.6623 | 1.0861 | 0.4346 |
| d3.3 | 1.2489 | 0.3979 | 0.9359 |
| d4.3 | 0.8778 | 1.7288 | 1.1908 |

Also, the surfaces s3.1 and s4.3 are configured in an aspherical form. Thus, Table 11 shows the fourth- and sixth-order aspherical surface coefficients A4 and A6 of the surfaces described above.

TABLE 11

| Aspherical surface coefficient | A4 | A6 |
| --- | --- | --- |
| r3.1 | −0.4004E-02 | 0.3572E-02 |
| r4.3 | 0.1426E-01 | 0.7222E-03 |

Table 12 shows the focal length (f), the open F number (FNo.), the field angle (2w), the conditional equations 1 to 5 and the values of f3.1, f3.2, f3, f4.1, f4.2 and f4 of the whole lens system of the zoom lens 1B.

TABLE 12

| |v5.1−v5.2| | 24.0 |
| |r5.2/fW · tanωW| | 1.7152 |
| |r1.2|fT| | 0.5821 |
| f3.1 | 1.7060 |
| f3.2 | −2.9313 |
| f3 | 4.0811 |
| 1/v3 | −0.0066 |
| f4.1 | −3.1872 |
| f4.2 | 1.8370 |
| f4 | 4.3363 |
| 1/v4 | 0.0020 |
| f | 1.0~10.0 |
| FNo. | 2.8~3.2 |
| 2ω | 57.0°~5.8° |

Figure 12C:
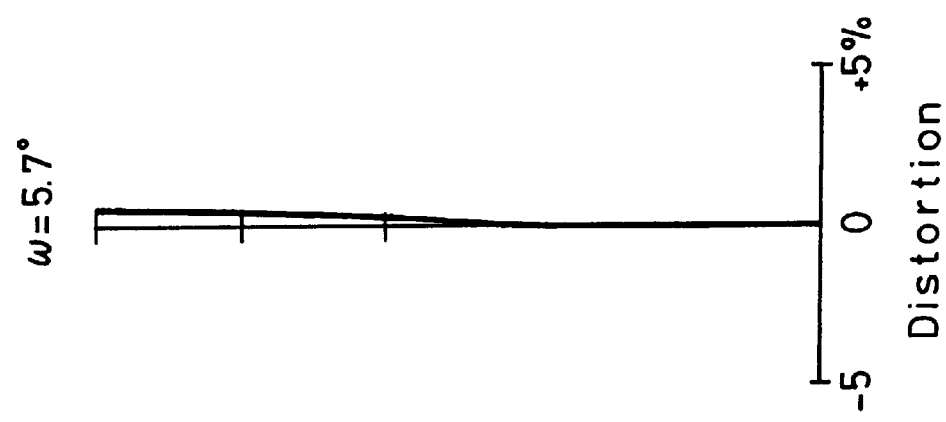
FIG. 12 is a diagram showing the spherical aberration, the astigmatism and the distortion at the intermediate focal point between the wide angle edge and the telephotographic edge.
Figure 12B:
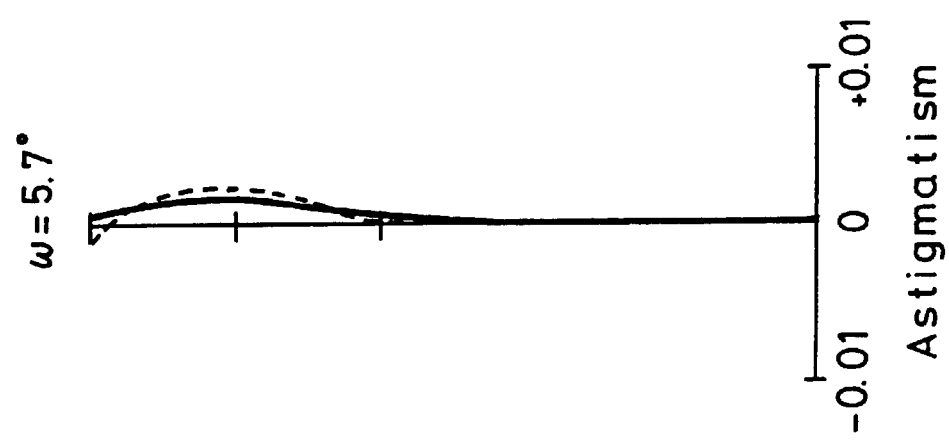
Figure 12A:
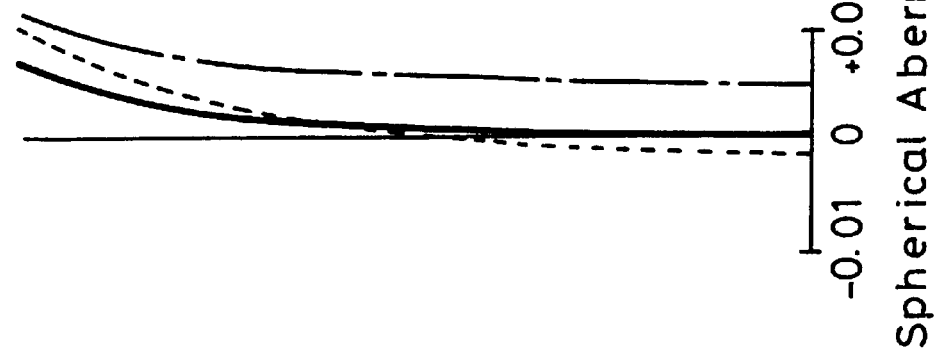
Figure 13A:
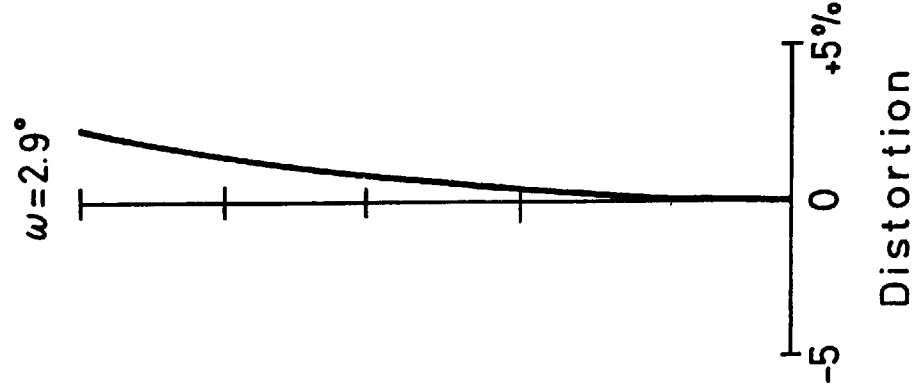
FIG. 13 is a diagram showing the spherical aberration, the astigmatism and the distortion at the telephotographic edge.
Figure 13B:
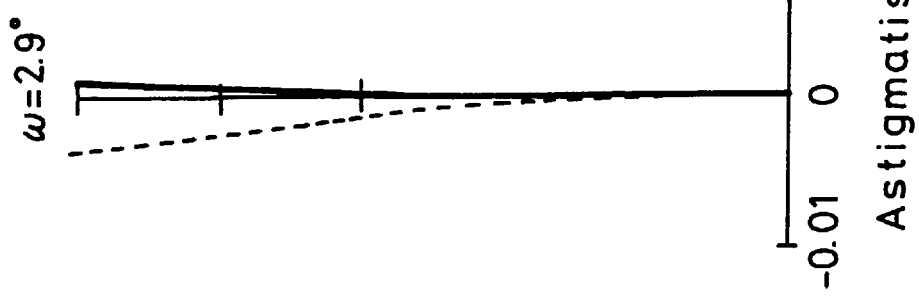
Figure 13C:
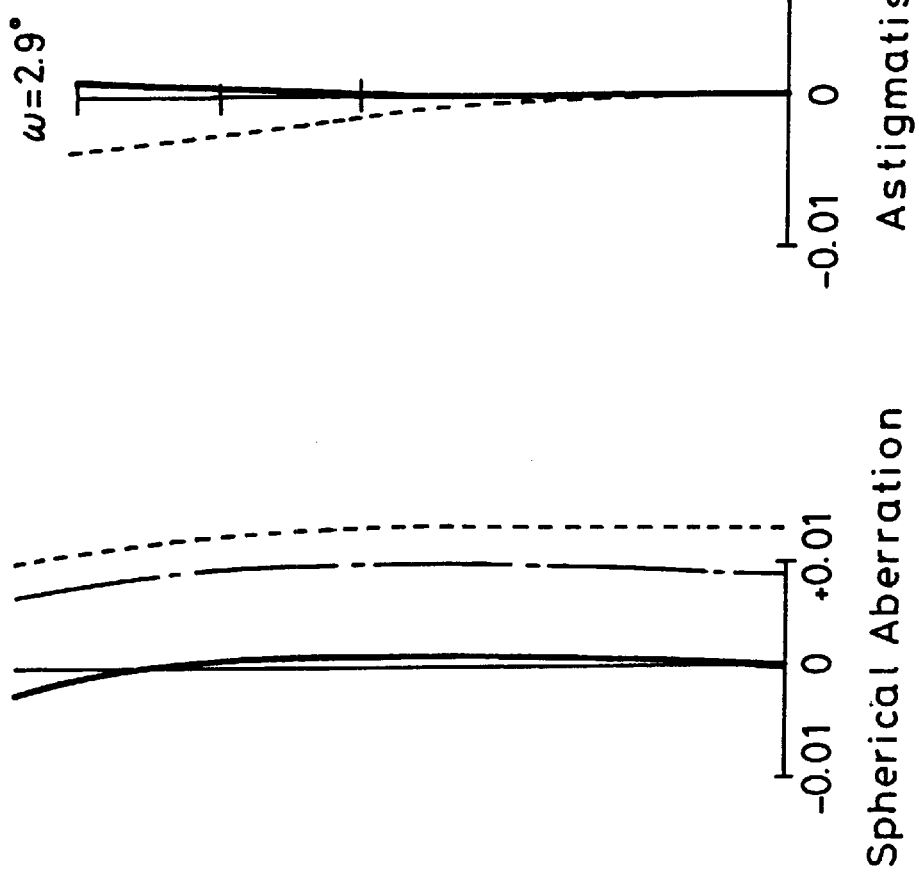

FIGS. 11 to 13 are a spherical aberration diagram, an astigmatism diagram and a distortion diagram, respectively, at the wide angle edge, the intermediate focal length and the telephotographic edge of the zoom lens 1B. In the spherical aberration diagram, the solid line indicates the values on the d line, the dashed line those on the g line and the one-dot chain those on the C line. In the astigmatism diagram, on the other hand, the solid line indicates the values on the sagittal image surface and the dashed line those on the meridional image surface.

Since certain changes may be made in the above apparatus without departing from the scope of the present invention herein involved, it is intended that all matter contained in the above description or shown in the accompanying drawings shall be interpreted as illustrative and not in a limiting sense.

It will be understood from the foregoing description that a zoom lens according to the present invention comprises, from the object side toward the image surface side, a first lens group having a positive refracting power, a second lens group having a negative refracting power and movable in position along the direction of the optical axis primarily for changing the magnification, a third lens group having a positive refracting power, a fourth lens group having a positive refracting power and movable in position along the direction of the optical axis thereby to correct the change in the image position due to the magnification change while focusing the image at the same time, and a fifth lens group having a substantially zero refracting power. The third lens group is configured of a joint lens of a convex lens and a concave lens, and the fifth lens group is configured of a joint lens of a concave lens and a convex lens. The conditions $-0.018<1/\upsilon 3<0.018$, $10<|\upsilon 5.1-\upsilon 5.2|$ and $1<|r5.2/fW\cdot\tan \omega W|<3$ are satisfied, where $\upsilon 3$ is the equivalent Abbe's number of the third lens group, $\upsilon 5.1$ is the Abbe's number of the lens on of the fifth lens group nearer to the object side, $\upsilon 5.2$ is the Abbe's number of the lens of the fifth lens group nearer to the image surface side, $r5.2$ is the radius of curvature of the lens joint surface of the fifth lens group, fW is the focal length of the whole lens system at the wide angle edge, and $\omega W$ is the half field angle at the wide angle edge. Thus, the color aberration on the axis and the color aberration of magnification are corrected by the fixed third and fifth lens groups, respectively, thereby making it possible to reduce the variations in the color aberration on the axis in the zooming process. In this way, there is provided a zoom lens of high image quality having the various aberrations improved and most suitable for use with a still camera. Further, the present invention is applicable to a CCD having more than one million pixels.

According to the present invention as described in claim 2, the first lens group is configured of four lenses including, from the object side, a joint lens of a concave lens and a convex lens, a convex lens and a convex meniscoid lens with the convex surface thereof facing toward the object in that order, and the relation $0.49<|r1.2/fT|<0.65$ is satisfied, where $r1.2$ is the radius of curvature of the joint surface of the joint lens of the first lens group, and fT is the focal length of the whole lens system at the telephotographic edge. It is thus possible to improve the blur of the color of a short wavelength at the telephotographic edge and thus to improve the color aberration in a very well balanced way over the whole range of zooming.

According to the present invention as described in claims 3 and 4, the fourth lens group is configured of a single convex lens having the Abbe's number of 50 or more. Therefore, the fourth lens group constitutes a proper achromatic lens and can reduce the variations of the color aberration on the axis and the color aberration of magnification.

According to the present invention as described in claims 5 and 6, the fourth lens group is configured of a joint lens of a concave lens and a convex lens, and the condition $-0.018<1/\upsilon 4<0.018$ is satisfied, where $\upsilon 4$ is the equivalent Abbe's number of the fourth lens group. Thus, the fourth lens group acts a proper achromatic lens thereby to reduce the variations of the color aberration on the axis and the color aberration of magnification.

According to the present invention as described in claims 7 to 10, the fifth lens group is configured in such a manner that a concave lens and a convex lens each having a flat surface and having a refractive index difference equal to or less than 0.05 on the d line are coupled to each other on the other curved surfaces. Since the fifth lens group has a substantially zero refractive index, the aberration of the single color can be corrected without being affected by other than the thickness thereof.

According to the present invention as described in claims 11 to 14, at least one surface of the lenses constituting the third lens group and at least one surface of the lenses constituting the fourth lens group are aspherical. Therefore, the astigmatism, the spherical aberration and the coma aberration can be corrected effectively.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A zoom lens comprising:

arranged sequentially from an object side to an image surface side, a first lens group having a positive refracting power;

a second lens group having a negative refracting power and movable in position along the direction of the optical axis thereby primarily to change a magnification;

a third lens group having a positive refracting power;

a fourth lens group having a positive refracting power and movable in position along the direction of the optical axis thereby to correct a variation of an image position due to a magnification change and also to focus an image; and a fifth lens group having a substantially zero refracting power;

wherein said third lens group is configured of a joint lens of a convex lens and a concave lens, and said fifth lens group is configured of a joint lens of a concave lens and a convex lens; and wherein the following conditions $-0.018<1/\upsilon 3<0.018$ $10<|\upsilon 5.1-\upsilon 5.2|$ $1<|r5.2/fw\cdot\tan \omega W|<3$ are satisfied, where $\upsilon 3$ is an equivalent Abbe's number of the third lens group, $\upsilon 5.1$ is an Abbe's number of the lens of the fifth lens group nearer to the object side, $\upsilon 5.2$ is an Abbe's number of the lens of the fifth lens group nearer to the image surface, $r5.2$ is a radius of curvature of the lens joint surface of the fifth lens group, fW is a focal length of the whole lens system at a wide angle edge, and $\omega W$ is a half field angle at the wide angle edge.

2. A zoom lens according to claim 1, wherein the first lens group is configured of four lenses including, from the object side, a joint lens of a concave lens and a convex lens, a convex lens and a convex meniscus lens with a convex surface thereof facing toward the object side; and wherein the condition $0.49<|r1.2/fT|<0.65$ is satisfied, where $r1.2$ is a radius of curvature of the joint surface of the joint lens of the first lens group, and fT is a focal length of the whole lens system at a telephotographic edge.

3. A zoom lens according to claim 1, wherein the fourth lens group is configured of a single convex lens having an Abbe's number of equal to or more than 50.

4. A zoom lens according to claim 2, wherein the fourth lens group is configured of a single convex lens having an Abbe's number of equal to or more than 50.

5. A zoom lens according to claim 1, wherein the fourth lens group is configured of a joint lens of a concave lens and a convex lens and the condition $-0.018<1/\upsilon 4<0.018$ is satisfied, where $\upsilon 4$ is an equivalent Abbe's number of the fourth lens group.

6. A zoom lens according to claim 2, wherein the fourth lens group is configured of a joint lens of a concave lens and a convex lens and the condition $-0.018<1\upsilon 4<0.018$ is satisfied, where $\upsilon 4$ is an equivalent Abbe's number of the fourth lens group.

7. A zoom lens according to claim 1, wherein the fifth lens group is configured of a concave lens and a convex lens each having a flat surface on one side thereof and having a difference of refractive indexes of equal to or less than 0.05 on the d line, said concave lens and said convex lenses being coupled to each other on the other curved surfaces thereof.

8. A zoom lens according to claim 2, wherein the fifth lens group is configured of a concave lens and a convex lens each having a flat surface on one side thereof and having a difference of refractive indexes of equal to or less than 0.05 on the d line, said concave lens and said convex lenses being coupled to each other on the other curved surfaces thereof.

9. A zoom lens according to claim 3, wherein the fifth lens group is configured of a concave lens and a convex lens each having a flat surface on one side thereof and having a difference of refractive indexes of equal to or less than 0.05 on the d line, said concave lens and said convex lenses being coupled to each other on the other curved surfaces thereof.

10. A zoom lens according to claim 4, wherein the fifth lens group is configured of a concave lens and a convex lens each having a flat surface on one side thereof and having a difference of refractive indexes of equal to or less than 0.05 on the d line, said concave lens and said convex lenses being coupled to each other on the other curved surfaces thereof.

11. A zoom lens according to claim 1, wherein at least one surface of the lenses constituting the third lens group and at least one surface of the lenses constituting the fourth lens group are made aspherical.

12. A zoom lens according to claim 2, wherein at least one surface of the lenses constituting the third lens group and at least one surface of the lenses constituting the fourth lens group are made aspherical.

13. A zoom lens according to claim 3, wherein at least one surface of the lenses constituting the third lens group and at least one surface of the lenses constituting the fourth lens group are made aspherical.

14. A zoom lens according to claim 4, wherein at least one surface of the lenses constituting the third lens group and at least one surface of the lenses constituting the fourth lens group are made aspherical.

* * * * *